Figure 7:
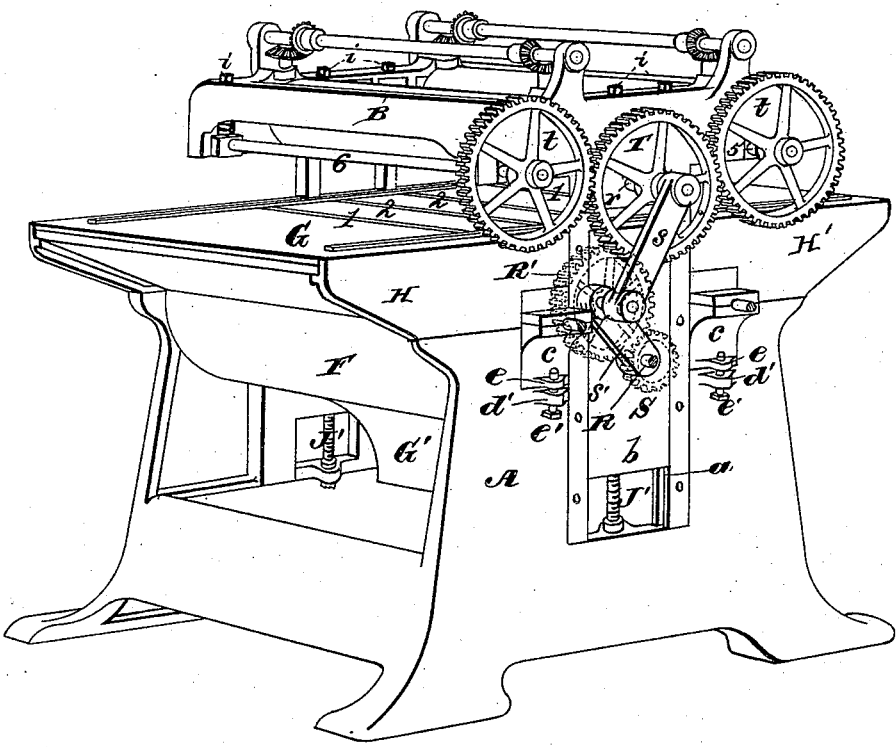

(No Model.) 4 Sheets—Sheet 1.
J. R. THOMAS, H. J. CORDESMAN, & F. DANNER.
SAND PAPERING MACHINE.
No. 287,340. Patented Oct. 23, 1883.
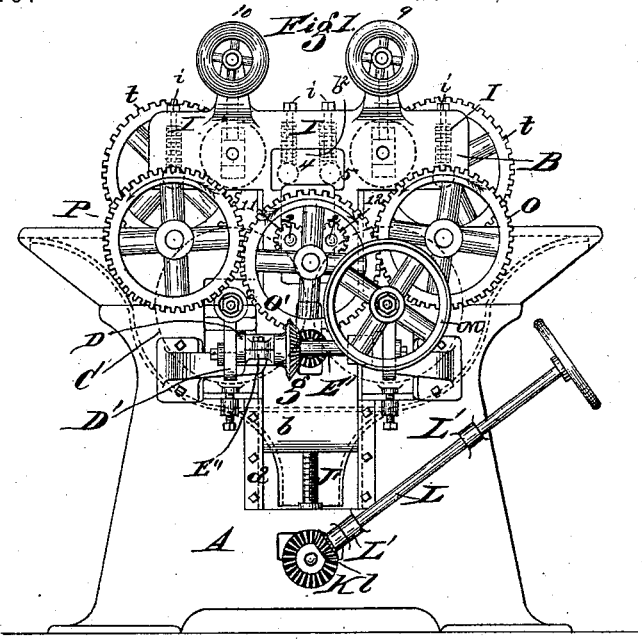
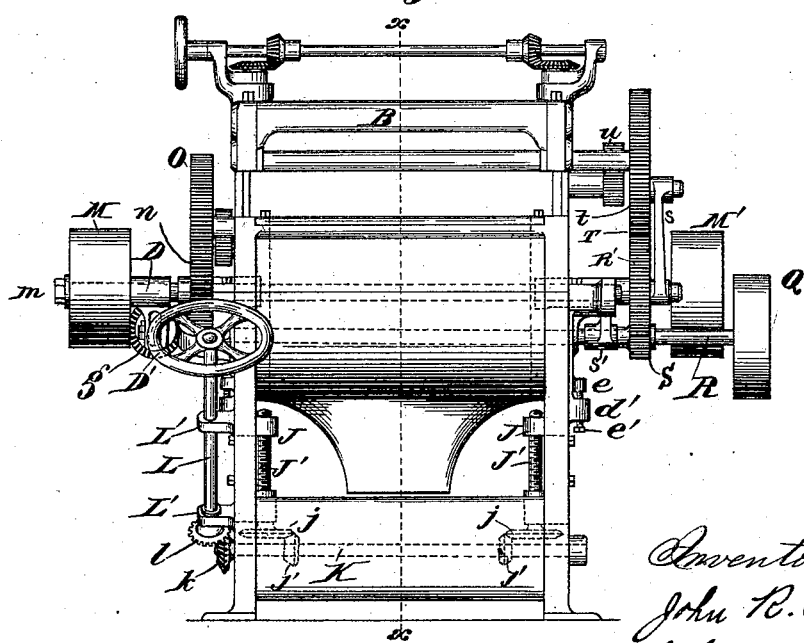

(No Model.) 4 Sheets—Sheet 2.
J. R. THOMAS, H. J. CORDESMAN, & F. DANNER.
SAND PAPERING MACHINE.
No. 287,340. Patented Oct. 23, 1883.
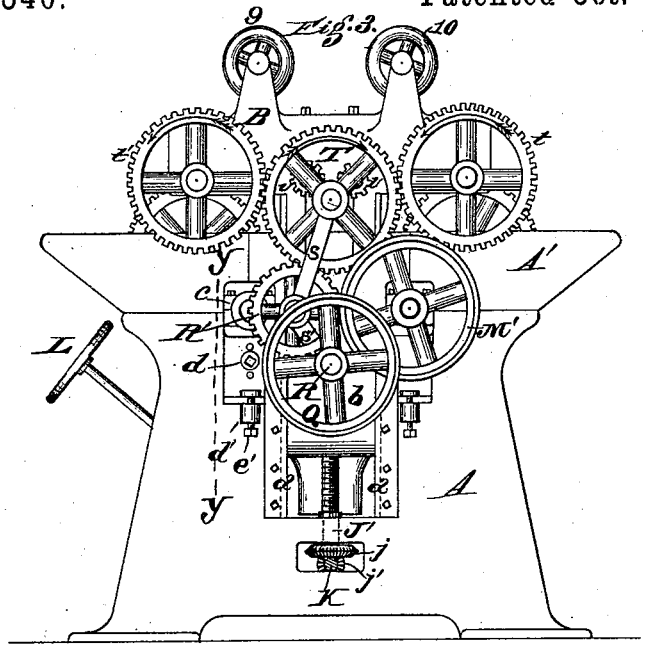
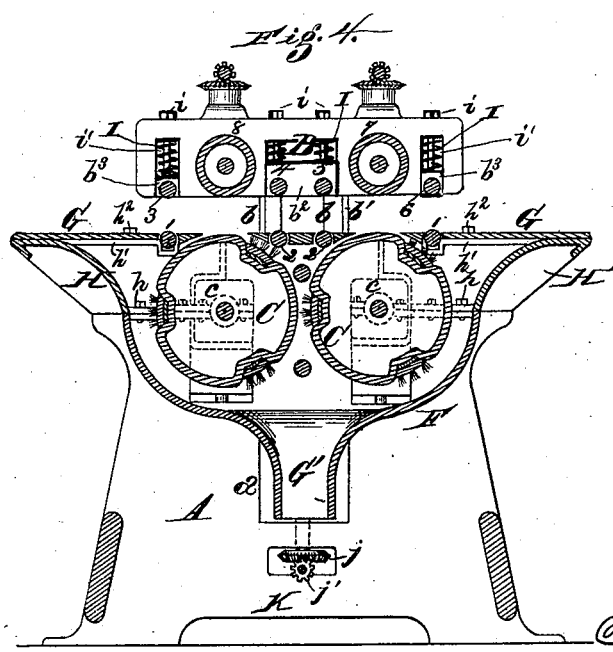

(No Model.) 4 Sheets—Sheet 3.
J. R. THOMAS, H. J. CORDESMAN, & F. DANNER.
SAND PAPERING MACHINE.
No. 287,340. Patented Oct. 23, 1883.
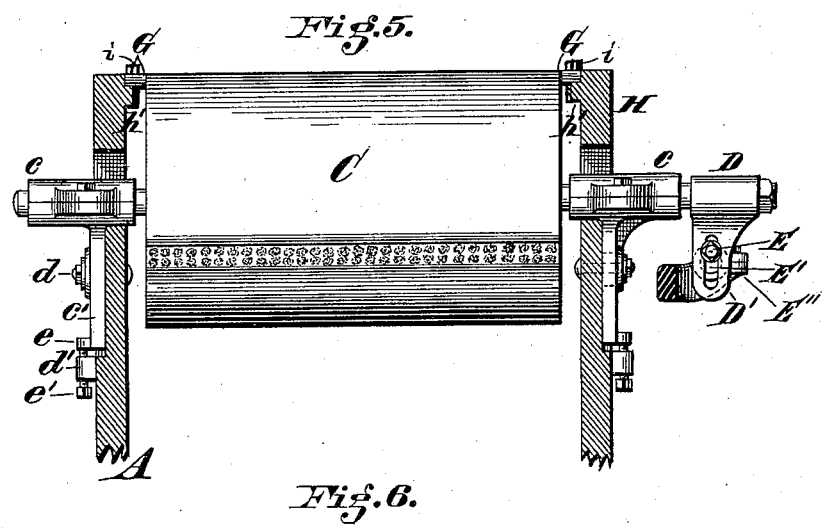
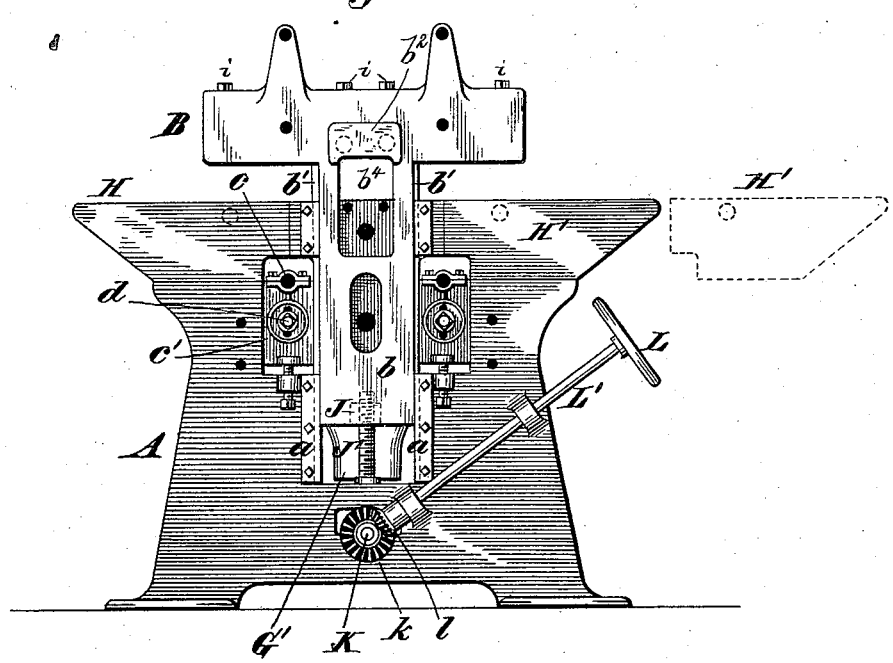

(No Model.) 4 Sheets—Sheet 4.
J. R. THOMAS, H. J. CORDESMAN, & F. DANNER.
SAND PAPERING MACHINE.
No. 287,340. Patented Oct. 23, 1883.

UNITED STATES PATENT OFFICE.

JOHN R. THOMAS AND HENRY J. CORDESMAN, OF CINCINNATI, AND FREDERICK DANNER, OF HOME CITY, ASSIGNORS TO THE CORDESMAN & EGAN COMPANY, OF CINCINNATI, OHIO.

SANDPAPERING-MACHINE.

SPECIFICATION forming part of Letters Patent No. 287,340, dated October 23, 1883.

Application filed March 17, 1883. (No model.)

*To all whom it may concern:*

Be it known that we, JOHN R. THOMAS, HENRY J. CORDESMAN, and FREDERICK DANNER, all citizens of the United States, and residents, JOHN R. THOMAS and HENRY J. CORDESMAN, of Cincinnati, in the county of Hamilton, State of Ohio, and FREDERICK DANNER, of Home City, said State and county, have invented certain new and useful Improvements in Sandpapering-Machines, of which the following is a specification.

Our invention relates to a sandpapering-machine which employs rotating reciprocating sand-drums for polishing or smoothing surfaces.

Our invention consists in the several features of construction and combinations of parts which are fully described in the following specification and defined in the claims appended thereto.

Figure 1 is a longitudinal elevation of one side of the machine embodying our invention. Fig. 2 is an end view of the same. Fig. 3 is a longitudinal elevation of the machine, (of the opposite side to that shown in Fig. 1.) Fig. 4 is a sectional elevation on line $x\ x$, Fig. 2. Fig. 5 is a transverse section on line $y\ y$, Fig. 3. Fig. 6 is a longitudinal elevation of the frame of the machine with the gearing removed. Fig. 7 is a perspective view, looking toward the end of the machine shown in Fig. 3, some of the parts being omitted to clearly show the vibratory link-arms.

It is very desirable, in sandpapering-machines, to have two sets of feeding-rolls between the two drums, and each set working in close proximity to the feeding-drum, so as to hold the stuff in the same horizontal plane. In sandpapering short stuff, where but one set of feeding-rolls is employed between the sand-drums, the end of the stuff drops after it has passed the outside feeding-rolls, and is not finished true, and, besides, the dropping of the stuff wears off the sand-paper drum very rapidly. In the use of two intermediate sets of feed-rolls between the sand-drums, it is necessary, first, to have the upper rolls of the set vertically over the lower rolls; second, to adjust these upper feed-rolls simultaneously; third, to adjust them in vertical planes. Our invention accomplishes all of these objects.

A represents the supporting-frame of the machine.

$a\ a$ represent grooved ways made upon either side of the open slot in the center of frame A.

B represents the rising and falling pressure-frame.

$b$ represents the standard-guides, which are provided with flanges $b'$, which slide in the grooves of ways $a$.

C C represent revolving reciprocating sand-drums; $c$, journal-boxes attached to frame A. They are preferably attached by slotted brackets $c'$, and secured in the frame by bolt $d$.

$d'$ represents a lug or ear on the frame A; $e$, a lug in which is pierced a socket which steps upon the point of bolt $e'$, which taps the lugs $d'$.

The journal-boxes $c$ are thus vertically adjusted by means of the step-bolts $e'$. Sand-drums C are given a slight reciprocal motion by means of journal-wrists D, which are each provided with slotted dependent arms $D'$ and crank-pins E, which are fixed eccentrically to the end of shaft $E'$, which journals in boxes $E''$, affixed to the frame A, as shown in Figs. 1, 2, and 5. $g$ represents beveled gears for driving shaft $E'$.

F represents a dust-hopper extending from the table G around under the sand-drums C, and provided with a spout, $G'$, through which the dust is exhausted. The tables G are made of detachable sections.

H H' represent detachable sections of the dust-chamber, which are attached to the fixed portion F by bolts and lugs $h$. They are provided with ledges $h'$, upon which rest the sections G, which may be secured to the sections H H' by bolts $h^2$, passing through the table into the ledges, or in any other manner.

1 1 represent feeding-rollers journaled upon the sections H H' and removable therewith.

By simply removing table-sections G ready access is obtained to the sand-drums for renewing the sand-paper attached thereon. By removing sections H G and the journal-caps above the shaft of the sand-drums the latter may be readily removed and replaced. This is a very important feature, as frequent access is required to these drums.

2 2 represent feeding-rollers journaled to the frame of the machine intermediate the sand-drums C C.

3, 4, 5, and 6 represent the top feeding-rolls on frame B. The journal-boxes are preferably attached to yielding springs I, placed in slots made in the frame B. Bolts $i$ may be mounted in the frame B, within the springs I, and arranged to swivel upon the journal-boxes of the feeding-rolls, whereby the latter may have vertical adjustment.

7 8 represent the pressure-rolls, which are journaled to frame B vertically over the sand-drums C.

J represents ears attached to the standard-guides $b$, into which ears screws J' tap. Screws J' are suitably journaled to the inside of frame A, and are provided with bevel-gears $j$ at their lower ends, which mesh with bevel-gears $j'$ on a transverse shaft, K, suitably journaled in frame A. Shaft K is provided at one of its ends with a bevel-gear, $k$, which engages a similar gear, $l$, on the end of a hand-wheel, L', journaled on the side of frame A, in convenient position for manipulation by the operator. By turning hand-wheel L the frame B and its contained pressure and feed rollers are raised and lowered, thereby regulating the pressure of the rolls upon the stuff which passes between these rolls and the sand-drums.

Pressure-rolls 7 and 8 are independently adjustable on their journal-boxes by hand-wheels 9 and 10, which turn screws tapping said journal-boxes.

Motion is transmitted to our machine as follows:

M represents a pulley keyed upon shaft $m$ for belting over a pulley on the main or driving shaft, and driving one of the sand-drums.

M' represents a similar pulley keyed upon the shaft of the other sand-drum on the opposite side of the machine. By using two independent driving-pulleys the sand-drums may be driven in opposite directions.

$n$ represents a gear keyed upon shaft $m$, engaging with gear O, keyed upon one of the feed-roll shafts.

O' represents a transmitting-gear meshing with gear O and driving-gear P, keyed upon the other feed-roll shaft, 1.

11 12 represent driving-gears keyed upon feed-roll shafts 2 2, which mesh with and are driven by a transmitting-gear keyed upon shaft carrying the gear O'.

Q represents a driving-pulley driven by an independent belt upon the main or counter shaft. It is keyed upon shaft R, which passes through the machine, and upon which is keyed the bevel transmitter-gear $g'$.

S represents a pinion keyed upon shaft R, which meshes with and drives expansive or vibratory gear R'. This gear R' is journaled to vibratory link-arms $s\ s'$, and transmits motion to gear T, which is keyed upon shaft $r$, and which transmits motion to gears $t\ t$, keyed upon the upper feed-roll shafts, 3 and 6.

$u\ v$ represent gears keyed upon the feed-roll shafts 4 and 5, which are driven by a gear keyed upon shaft $r$.

As the hand-wheel L is turned to elevate the pressure-frame B, and thereby elevating gears T $t\ t$ with said frame, link-arms $s\ s'$ vibrate gear R', so that it continues in mesh with the gears T and the small gear S upon shaft R, moving gear R' inward and upward in the arc of a circle. A reverse motion of hand-wheel L moves the said parts in a contrary direction, thereby allowing the frame B, with its contained driven devices and gears, to be adjusted while in motion without interfering with the operation of the machine.

In order to adjust the two feed-rolls 4 and 5 simultaneously in vertical lines, the standard-guides $b$ are slotted, and the feed-rolls 4 and 5 are journaled within these slotted standards. Our method of constructing the slotted standards $b$ to project down into the sides of the frame A at the center enables the adjusting-gears and shafts for raising and lowering the frame B to be mounted on the stationary frame A, and by tapping the adjusting-screws to the under side of the standards $b$ a less number of adjusting-gears are necessary to do the work, making the machine cheaper, more simple, and durable. Moreover, this construction allows the operator to stand at the table at the front of the machine, and by means of the hand-wheel L, journaled upon the main frame, to readily adjust the same. The rolls 3 and 6 are journaled in boxes $b^3$, which are set in recesses $i'$, formed in the inner faces of the frame B, and near the ends thereof. The two feed-rolls 4 and 5 are both journaled in a single box, $b^2$, which is set in a slot, $b^4$, cut completely through the central portion of the frame B, and these rolls are simultaneously adjusted toward and from the lower feed-rolls. The construction named is shown in Figs. 1, 4, and 6.

We claim—

1. A sandpapering-machine composed of a stationary main frame, A, upon which are journaled the sand-drums and the lower feed-rolls, in combination with the adjustable frame B, having the slotted standards $b$, and the feed-rolls 3 and 4, journaled within the slots of the standards $b$, for the simultaneous adjustment of the upper feed-rolls in vertical lines, substantially as herein set forth.

2. In a sandpapering-machine, a vertically-adjusting frame, B, having slotted standard-guides $b$, working in grooves in the main frame, in combination with the feed-rolls 4 and 5, journaled in the slotted standards $b$, and driven by expansion vibratory gears from pinion S, journaled on the main frame.

3. In a sandpapering-machine, the main frame A, having hand-wheel L', and pinions $j\ j$ and their carrying-shafts, journaled upon the frame A, in combination with ears J, attached to standards b, and adjusting-screws J', adjusting frame B to and from frame A, substantially as described.

4. In combination with the dust-chamber C' and sand-drum C, working therein, the detachable table G, supported by flanges formed upon the detachable sections H, covering the upper portion of the chamber C', substantially as herein set forth.

5. In a sandpapering-machine, the sand drum or drums C, mounted in journal-boxes c, and reciprocated laterally therein by means of the pendent slotted wrists D D', crank-shaft E E', and bevel driving-gears g, substantially as herein set forth.

In testimony whereof we have hereunto set our hands in the presence of two subscribing witnesses.

JOHN R. THOMAS.
HENRY J. CORDESMAN.
FREDERICK DANNER.

Witnesses:
THOS. P. EGAN,
JNO. E. JONES.